T. H. MILLER.
BOWL CLAMP.
APPLICATION FILED JULY 5, 1919.

1,407,702.  Patented Feb. 28, 1922.

WITNESS:
Rob't R. Kitchel.

INVENTOR
Theodore H. Miller
BY Frank L. Busser
ATTORNEY.

UNITED STATES PATENT OFFICE.

THEODORE H. MILLER, OF POUGHKEEPSIE, NEW YORK, ASSIGNOR TO THE DE LAVAL SEPARATOR COMPANY, OF NEW YORK, N. Y., A CORPORATION OF NEW JERSEY.

BOWL CLAMP.

1,407,702.  Specification of Letters Patent.  Patented Feb. 28, 1922.

Application filed July 5, 1919. Serial No. 308,879.

*To all whom it may concern:*

Be it known that I, THEODORE H. MILLER, a citizen of the United States, residing at Poughkeepsie, county of Dutchess, and State of New York, have invented a new and useful Improvement in Bowl Clamps, of which the following is a full, clear, and exact description, reference being had to the accompanying drawings, which form a part of this specification.

My invention consists in improved means for holding a centrifugal bowl while it is being disassembled, particularly while the clamping nut is being unscrewed.

Bowl-holding devices have previously been made with pins to enter holes in the bottom of the bowl. These require that the bowl bottom be made heavy to provide stock for these holes and require, also, that the bowl be placed in a certain position, often forcing the wrench to an inconvenient position for operation. Bowl-holding devices have also been made in the form of a loop tightened by a screw. Such a device allows the bowl to be placed in a convenient position for starting the nut, but another operation is required to tighten the screw.

The object of my invention is to provide a bowl clamp which is quickly and automatically operable, convenient, adapted to hold the bowl in any position, and which will not be an obstruction on a table top.

In the accompanying drawings, which illustrate three embodiments of my invention:—

$a$ represents a strip of metal bent into a loop and having each end bent outward and backward to form an eye $b$. $c$ is a member having on its under side two lugs $d$ adapted to enter the eyes on the end of the loop. In the preferred form this member is bent downward and provided with two horizontally extending lugs $e$ adapted to enter sockets in a base member $f$, which may be secured by screws $g$ to a table top or other support.

Figure 1:
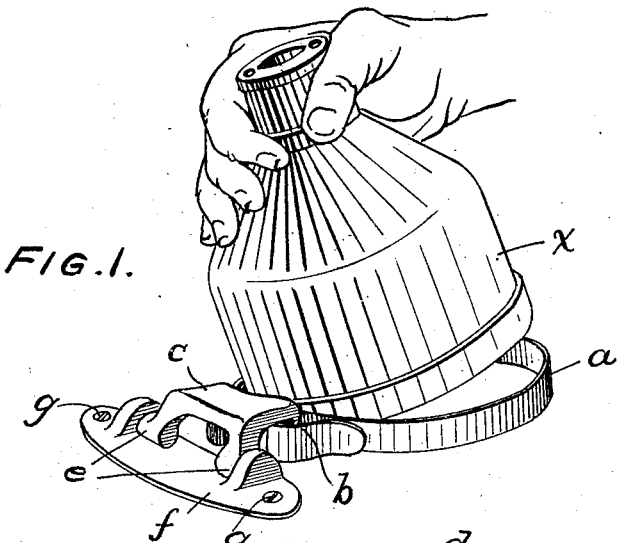
Fig. 1 shows in perspective a preferred form of my improved clamp, with a bowl being placed in it.
Figures 2, 3:
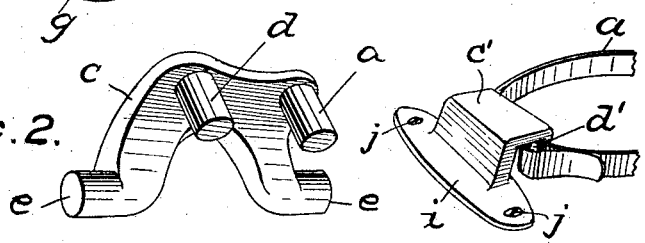
Fig. 2 shows in perspective one of the members of the preferred form.
Fig. 3 and Fig. 4 are perspective views of alternative forms.

In the modification shown in Fig. 3, the member $c'$ having the lugs $d'$ is, at the back, curved downward and then outward to form an integral base $i$, which may be secured to the table by screws $j$.

Figure 4:
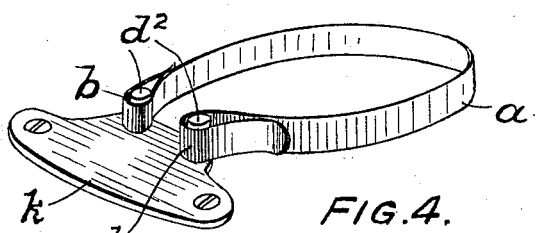

In the modification shown in Fig. 4 lugs $d^2$ extend upward from a flat plate $k$, so that the loop may be readily removed.

Figure 5:
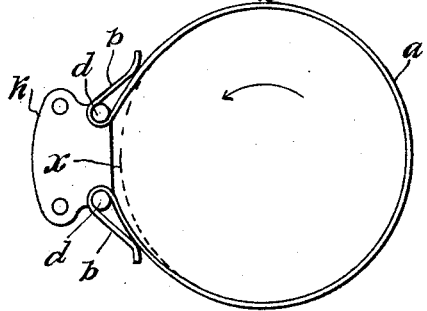
Figs. 5 and 6 are diagrams showing how the bowl automatically clamps itself when turned within the clamp.
Figure 6:
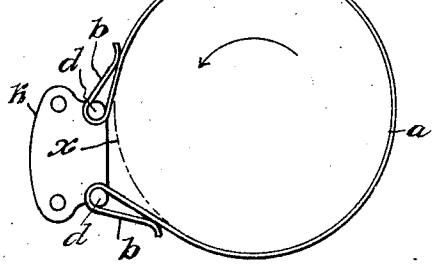

In operation, the bowl $x$ is placed in the loop, and the wrench or spanner is applied to the nut and turned. The bowl will then slide around on the table so that one end of the loop $a$ will press tightly against the bowl while the lug $d$ embraced by the eye $b$ at the other end of the loop will swing outward, relatively to the bowl, in an arc about the other lug, thereby decreasing the angular distance between the two lugs and drawing the loop so tightly around the bowl that it is held from turning while the nut is unscrewed. The mode of operation will be clearly understood by reference to Figures 5 and 6.

By the "angular distance" between the two lugs, I refer to the angular distance relatively to the centre of the loop; the angular distance between two points relatively to a circle being the length of the arc, measured in degrees, between radii intersecting such points. As may be seen by reference to Figs. 5 and 6, the absolute distance between the lugs $d$, $d$, is of course unchanged by manipulation of the bowl, as is also the absolute distance between the two ends of the loop, but the angular distance between them is reduced.

In the preferred form, when not in use, the member $c$ and the loop $a$ may be turned up out of the way, or the loop may be easily removed completely. If the base $f$ is close to the end of the table, the loop may be turned up against the wall, leaving the table top clear.

In the modifications, the loops cannot be turned up out of the way, but in the second modification, as in the preferred form, the loop may be removed. In actual use, all the forms have the same operation.

I am aware that it is old to construct a wrench, jar holder or the like in the form of a flexible loop the two ends of which engage lever mechanism operable, by a swinging movement, to tighten the loop so that the article may be turned or held from turning. In the case of a jar, this operation involves the use of one hand to hold the jar from turning while the cap or closure is removed with the other hand. This mode of operation is impracticable in the case of a heavy bowl, to remove the clamping nut of which requires that both hands shall be left free. In my invention instead of a hand-manipulatable holder, I make no attempt to initially prevent the bowl from turning, but construct the holder so that it may be fixedly positioned and so that the initial turning movement of the bowl, due to the turning of the clamping nut, will cause a bodily displacement of the bowl and thereby tighten the loop about the bowl until the bowl can no longer turn, whereby the subsequent turning of the clamping nut will effectuate its removal.

Having now fully described my invention, what I claim and desire to protect by Letters Patent is:

1. An automatically acting holder for a bowl adapted to prevent the bowl from continuing to turn during the nut loosening operation tending to turn it, comprising a flexible loop adapted to encircle the bowl, and fixedly anchored means adapted, as the bowl is initially turned by manual force, to automatically cooperatively act with the bowl and loop to contract the loop upon and cause it to grip the bowl.

2. An automatically acting holder for a bowl adapted to prevent the bowl from continuing to turn during the nut loosening operation tending to turn it, comprising a flexible open-ended loop adapted to encircle the bowl and a fixedly anchored device comprising holders engaging the ends of the loop, and adapted to coact with the bowl, as the latter is initially turned by manual force, to bodily displace the bowl relatively away from one holder, and thereby diminish the angular distance between the two holders and the two ends of the loop and thus grip the bowl so tightly as to prevent further turning.

3. An automatically acting holder for a bowl adapted to prevent the bowl from continuing to turn during the disassembling operation tending to turn it, comprising a loop having eyes at its ends, a member having vertical lugs adapted to enter said eyes and hold the loop against horizontal rotation, and a second fixedly positioned member to which the first member is hinged on a horizontal axis.

4. A clamping device for holding a centrifugal separator bowl while loosening the nut therefrom consisting of a flexible non-stretchable embracing band adapted to embrace the bowl and fixed means for anchoring the band at two points adjacent each other while loosening the nut from the bowl.

In testimony of which invention, I have hereunto set my hand, at Poughkeepsie, on this 28th day of June, 1919.

THEODORE H. MILLER.